US008997036B2

(12) United States Patent
Sun

(10) Patent No.: US 8,997,036 B2
(45) Date of Patent: Mar. 31, 2015

(54) USING A WEB-BASED SOFTWARE ORIENTED ARCHITECTURE METHOD AND SYSTEM FOR INTEGRATING 3D DESIGN SOFTWARE PROGRAMS

(75) Inventor: Mingke Sun, Guangdong (CN)

(73) Assignee: Dongguan Goscien Electrical and Mechanical Technology Services Co. Ltd, Guangdong (CN)

( * ) Notice: Subject to any disclaimer, the term of this patent is extended or adjusted under 35 U.S.C. 154(b) by 20 days.

(21) Appl. No.: 13/995,957

(22) PCT Filed: Aug. 31, 2011

(86) PCT No.: PCT/CN2011/079197
§ 371 (c)(1),
(2), (4) Date: Jun. 20, 2013

(87) PCT Pub. No.: WO2012/083723
PCT Pub. Date: Jun. 28, 2012

(65) Prior Publication Data
US 2013/0283228 A1 Oct. 24, 2013

(30) Foreign Application Priority Data

Dec. 21, 2010 (CN) .......................... 2010 1 0597239

(51) Int. Cl.
*G06F 9/44* (2006.01)
*G06T 19/00* (2011.01)
(52) U.S. Cl.
CPC .. *G06F 8/20* (2013.01); *G06T 19/00* (2013.01)
USPC ....................................................... 717/104
(58) Field of Classification Search
None
See application file for complete search history.

(56) References Cited

U.S. PATENT DOCUMENTS

| 7,823,125 | B2 * | 10/2010 | Batabyal ....................... 717/120 |
| 8,069,435 | B1 * | 11/2011 | Lai ................................ 717/106 |
| 2005/0044197 | A1 * | 2/2005 | Lai ................................ 709/223 |
| 2007/0255833 | A1 * | 11/2007 | Sharma et al. ................ 709/226 |

(Continued)

FOREIGN PATENT DOCUMENTS

| CN | 101710361 A | 5/2010 |
| CN | 102033753 A | 4/2011 |
| CN | 102033848 A | 4/2011 |

OTHER PUBLICATIONS

Arsanjani, Ali, Service-Oriented Modeling and Architecture, How to identify, specify, and realize services for your SOA, IBM White Paper, Nov. 20, 2009.*

*Primary Examiner* — Don Wong
*Assistant Examiner* — Reshaun M Finkley

(57) ABSTRACT

A Software Oriented Architecture (SOA)-based integration method for 3D design system comprising the following steps: 1) constructing an SOA integration development system platform comprising four structural layers: application layer, business layer, service layer and resource layer, 2) setting global model data server at the resource layer, and setting a design information integration platform at the business layer; 3) setting multiple pieces of third-party 3D model design system software at the resource layer, encapsulating them into WEB service, and setting the WEB service at the service layer, 4) setting database systems of the multiple pieces of third-party 3D model design system software at the resource layer, connecting the database systems to the global model data server, 5) setting an integration web portal at the application layer, the portal is integrated with sign-in links of the third-party 3D model design system software. A system for implementing the above method is also provided.

3 Claims, 1 Drawing Sheet

(56) References Cited

U.S. PATENT DOCUMENTS

| | | | |
|---|---|---|---|
| 2008/0109276 A1* | 5/2008 | Ionfrida et al. | 705/7 |
| 2009/0158237 A1* | 6/2009 | Zhang et al. | 717/100 |
| 2013/0205023 A1* | 8/2013 | Bernardini et al. | 709/224 |
| 2013/0283228 A1* | 10/2013 | Sun | 717/104 |

* cited by examiner

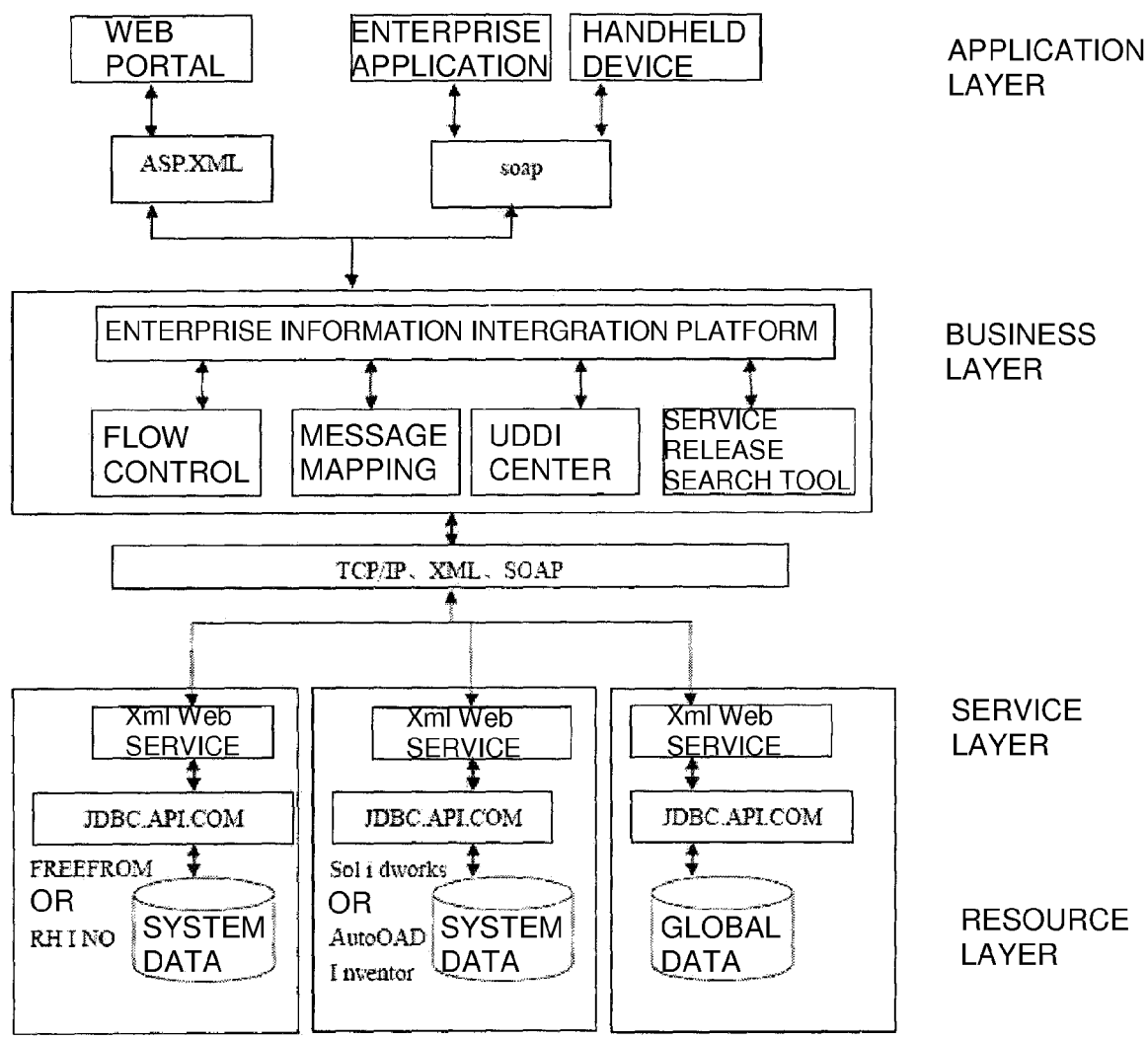

USING A WEB-BASED SOFTWARE ORIENTED ARCHITECTURE METHOD AND SYSTEM FOR INTEGRATING 3D DESIGN SOFTWARE PROGRAMS

BACKGROUND OF THE INVENTION

The present invention relates to software development technology, and specifically relates to Software Oriented Architecture (SOA)-based integration method and system for 3D Design System.

Application Programming Interface (API) is a collection of some pre-specified functions. API aims at providing applications and the ability to access a set of routines by developers based on certain software or hardware without the need of accessing a source code or understanding details of an internal operating mechanism.

Due to increasingly common application of the Internet and increasingly detailed division of labor and closer collaboration between labors in the society, different parties involved in a 3D model design of a product would also like to use a platform for remote synergic design and real-time sharing of design data.

Nowadays, many pieces of commercialized 3D model design system software have been sharing resources with secondary developers so that they can assign the resources. Through software API available to the public, assignment of resources can strengthen correlation between contents of different systems. Also, these open platforms set a higher value for their users and developers, and they prepare the conditions for realizing synergic design and data integration.

Currently, applicable API standards include SQL API according to American National Standards Institute (ANSI). Some other standards applicable to other types are still under preparation. API can be applied to all computer platforms and operation systems. These API adopt different formats to connect data. Different data commands and parameters are required by different kinds of data format in order to perform accurate data communication, and at the same time different types of errors will be generated by different kinds of data format. Therefore, apart from having the knowledge required for data sharing, these API have to tackle many network parameter problems and possible factors of errors. In other words, each application should ensure whether its performance is strong enough to support communications in the application. However, since this kind of API only processes one kind of information format, information delivery API in this case only supplies lesser commands, network parameters and error factors subsets. Accordingly, delivery API significantly reduces system complicacy. Therefore, when application requires multi-platforms to share data, use of information delivery API is a more preferable option.

In the prior art, different pieces of 3D model design software exist in different regions and networks in different forms of existence, for example they exist as single units each operated by a single user or they are shared by limited users in a Local Area Network (LAN) Client/Server (C/S) architecture. However, these different pieces of 3D model design software cannot mutually communicate with one another. Therefore, it is not possible to achieve remote synergic design and real-time sharing of design data.

It is now possible to solve the problems existing in the prior art due to rapid development of architectural technology of Service Oriented Architecture (SOA) software system in recent years. Nowadays, SOA has already become a new generation of advanced, matured, and standardized application architecture most preferable by enterprises. However, in the 3D model design software industry, use of SOA in an integration system for 3D model design system has not been disclosed yet.

BRIEF SUMMARY OF THE INVENTION

In view of the aforesaid disadvantages now present in the prior art, the present invention provides an SOA-based integration method for 3D design system. The present invention is highly efficient and standardized and it also achieves synergic effect and crosses multiple platforms. The present invention integrates a plurality of 3D model design systems independent and structurally different from one another under one network architecture where only one sign-in interface and only one working platform are used, thereby achieving synergic design, data sharing and real-time exchanges.

Another object of the present invention is to provide an SOA-based integration system for 3D design to realize the said SOA-based integration method. The SOA-based integration system for 3D design is highly integrated and easy to use.

To attain the above objects, the present invention adopts the following technical proposal:

An SOA-based integration method for 3D design system, characterized in that, the method comprises the following steps:

1) constructing an SOA integration development system platform comprising four structural layers connected and communicated with one another, and they are, from top to bottom, an application layer, a business layer, a service layer, and a resource layer;

2) setting at least one global model data server at the resource layer, and setting a design information integration platform at the business layer;

3) setting multiple pieces of third-party 3D model design system software at the resource layer, encapsulating them into WEB service through API program thereof, and setting the WEB service at the service layer;

4) setting database systems of the multiple pieces of third-party 3D model design system software at the resource layer, connecting the database systems to the global model data server through a data bus for mutual communication;

5) setting an integration web portal at the application layer, wherein the portal is integrated with sign-in links of the multiple pieces of third-party 3D model design system software.

In the said step 3), the multiple pieces of third-party 3D model design system software being targeted are each subject to WEB encapsulation which comprises the following steps:

31) quoting API function database of the targeted third-party 3D model design system software;

32) declaring WEB service target;

33) declaring WEB service method;

34) initializing declaration of a target of the targeted third-party 3D model design system software;

35) assigning API functions to operate data;

36) releasing quote of local application target.

The third-party 3D model design system software is one of the following: FREEFORM®, AUTOCAD®, SOLIDWORKS®, INVENTOR®, RHINO®.

An SOA-based integration system for 3D design for realizing the said SOA-based integration method for 3D design system, characterized in that, the SOA-based integration system for 3D design is a Web service integration application platform based on Web Service technology, comprising four structural layers connected and communicated with one another, namely, from top to bottom, an application layer, a business layer, a service layer, and a resource layer; global model data server is set at the resource layer; a design information integration platform is set at the business layer; the design information integration platform is integrated with sign-in links of multiple pieces of third-party 3D model design system software to provide unified user port, unified user interface, operation method and data representation to users; the global model data server provides public data storage and exchange for each of the multiple pieces of third-party 3D model design system software.

The third-party 3D model design system software is any one of the following: FREEFORM®, AUTOCAD®, SOLIDWORKS®, INVENTOR®, RHINO®.

By constructing an integration platform based on SOA, pieces of 3D model design system software such as FREEFORM®, AUTOCAD®, SOLIDWORKS®, INVENTOR® and RHINO® originally working and operating independently from one another are now integrated into one architecture and platform by the present invention to achieve synergic design and real-time data exchange. Accordingly, works can be done simultaneously across different platforms and regions to increase the speed of synergic design between different product design enterprises and between different designers. Also, data storage and exchange between different software systems are also simplified.

The present invention will be further described in detail below with reference to a detailed embodiment.

BRIEF DESCRIPTION OF THE DRAWINGS

FIG. 1 is a schematic structural view illustrating a system of the present invention.

DETAILED DESCRIPTION OF THE INVENTION

As shown in FIG. 1, the present invention provides an SOA-based integration method for 3D design system comprising the following steps:

1) constructing an SOA integration development system platform comprising four structural layers connected and communicated with one another, namely, from top to bottom, an application layer, a business layer, a service layer, and a resource layer;

2) setting at least one global model data server at the resource layer, and setting a design information integration platform at the business layer;

3) setting multiple pieces of third-party 3D model design system software at the resource layer, encapsulating them into WEB service through API program thereof, and setting the WEB service at the service layer;

the multiple pieces of third-party 3D model design system software being targeted are each subject to WEB encapsulation which comprises the following steps:

31) quoting API function database of the targeted third-party 3D model design system software;

32) declaring WEB service target;

33) declaring WEB service method;

34) initializing declaration of a target of the targeted third-party 3D model design system software;

35) assigning API functions to operate data;

36) releasing quote of local application target;

4) setting database systems of the multiple pieces of third-party 3D model design system software at the resource layer, connecting the database systems to the global model data server through a data bus for mutual communication;

5) setting an integration web portal at the application layer, wherein the portal is integrated with sign-in links of the multiple pieces of third-party 3D model design system software.

The third-party 3D model design system software is one of the following: FREEFORM®, AUTOCAD®, SOLIDWORKS®, INVENTOR®, RHINO®. Alternatively, it may integrate with other 3D model design system according to practical needs, or it may be a self-developed 3D model design system.

Specifically, AUTOCAD® 2006 provides .NET API port; FREEFORM® system provides GHOST port or secondary development tools; INVENTOR®, RHINO®V4 and SOLIDWORKS®2010 all provide API port.

The present invention also provides an SOA-based integration system for 3D design to realize the said SOA-based integration method for 3D design system. The SOA-based integration system for 3D design is a Web service integration application platform based on Web Service technology, comprising four structural layers connected and communicated with one another, namely, from top to bottom, an application layer, a business layer, a service layer, and a resource layer; global model data server is set at the resource layer; a design information integration platform is set at the business layer; the design information integration platform is integrated with sign-in links of multiple pieces of third-party 3D model design system software to provide unified user port, unified user interface, operation method and data representation to users; the global model data server provides public data storage and exchange for each of the multiple pieces of third-party 3D model design system software.

By constructing an integration platform based on SOA, pieces of 3D model design system software such as FREEFORM®, AUTOCAD®, SOLIDWORKS®, INVENTOR® and RHINO® originally working and operating independently from one another are now integrated into one architecture and platform by the present invention to achieve synergic design and real-time data exchange. Accordingly, works can be done simultaneously across different platforms and regions to increase the speed of synergic design between different product design enterprises and between different designers. Also, data storage and exchange between different software systems are also simplified.

The following description is an illustration of WEB encapsulation in the operation of said step 3 by reference to 3D model design system SOLIDWORKS®2010.

Fragments of codes for a basic encapsulation method are as follows:

```
......
   1) quoting API function database of the targeted third-party
3D model design system software SOLIDWORKS ®2010:
   Using SIdworks;
......
   2) declaring WEB service target:
   Public class SOLIDWORKS ®Service: System. Web. Services.
WebService
   {
   3) declaring WEB service method:
   [WebMethod]
   Public string modifyparam(string param, string saveName)
   {
       ......// parameter declaration and initialization
       Try
       {
   4) // initializing declaration of target of SOLIDWORKS ®2010:
   Sldworks. Sldworks swApp;
   swApp=new Sldworks .Sldworks ( );
   Imode1Doc2 modDoc;
```

-continued

```
5) // assigning API functions to operate data:
modDoc=(Sldworks. Imode1Doc2) swApp . OpenDoc6(filePath,
1, 0 " ", ref longstatus,    ref longwarnings);
modDoc=(Sldworks. Imode1Doc2) swApp. ActivateDoc(filepath);
......
}
Catch(Exception s)
}
6) releasing quote of local application target:
Finally
{
    swApp=null;
}
}
}
```

WEB encapsulation in other target software applies the same steps as above but there are differences in the codes. The differences however will not be detailed herein.

The SOA-based integration method and system for 3D design provided by the present invention has a high degree of integration. The present invention is simple to use and suitable to be used in heterogeneous environment. Also, the present invention spans across different platforms and regions. Therefore, the present invention can be widely used to develop various kinds of synergic design systems.

The above description is only a preferred embodiment of the present invention. The above description does not intend to limit the present invention. Although the present invention is described by reference to an illustration of a preferred embodiment, the present invention should not be therefore limited to the preferred embodiment. Any person skilled in this field of art may partially change and adjust the method and technical features described above given that the change and adjustment do not deviate from the scope of the technical proposal of the present invention. The changed or adjusted description or embodiment will constitute an equivalent replacement of the original description or embodiment. Any simple amendment or adjustment to the above description made in accordance with the technical essence of the present invention without deviating from the disclosure of the present invention should fall within the scope of the technical proposal of the present invention.

What is claimed is:

1. A Software Oriented Architecture (SOA)-based integration method for 3D design system, characterized in that, the Software Oriented Architecture-based integration method for 3D design system comprises the following steps:
   1) constructing an Software Oriented Architecture integration development system platform comprising four structural layers connected and communicated with one another, namely, from top to bottom, an application layer, a business layer, a service layer, and a resource layer;
   2) setting at least one global model data server at the resource layer, and setting a design information integration platform at the business layer;
   3) setting multiple pieces of third-party 3D model design system software at the resource layer, encapsulating them into WEB service through API program thereof, and setting the WEB service at the service layer;
   4) setting database systems of the multiple pieces of third-party 3D model design system software at the resource layer, connecting the database systems to the global model data server through a data bus for mutual communication;
   5) setting an integration web portal at the application layer, wherein the portal is Integrated with sign-in links of the multiple pieces of third-party 3D model design system software; the third-party 3D model design system software is one of the following: FREEFORM®, AUTOCAD®, SOLIDWORKS®, INVENTOR®, or RHINO®.

2. The Software Oriented Architecture-based integration method for 3D design system as in claim 1, wherein in said step 3), the multiple pieces of third-party 3D model design system software being targeted are each subject to WEB encapsulation which comprises the following steps:
   3-1) quoting API function database of the targeted third-party 3D model design system software;
   3-2) declaring WEB service target;
   3-3) declaring WEB service method;
   3-4) initializing declaration of a target of the targeted third-party 3D model design system software;
   3-5) assigning API functions to operate data;
   3-6) releasing quote of local application target.

3. A Software Oriented Architecture-based integration system for 3D design for realizing the said Software Oriented Architecture-based integration method for 3D design system of claim 1, characterized in that, the Software Oriented Architecture-based integration system for 3D design is a Web service integration application platform based on Web Service technology, comprising four structural layers connected and communicated with one another, namely, from top to bottom, an application layer, a business layer, a service layer, and a resource layer; global model data server is set at the resource layer; a design information integration platform is set at the business layer; the design information integration platform is integrated with sign-in links of multiple pieces of third-party 3D model design system software to provide unified user port, unified user interface, operation method and data representation to users, the global mode/data server provides public data storage and exchange for each of the multiple pieces of third-party 3D model design system software; the third-party 3D model design system software is any one of the following: FREEFORM®, AUTOCAD®, SOLIDWORKS®, INVENTOR®, or RHINO®.

* * * * *